United States Patent
Yoon et al.

(10) Patent No.: US 9,239,458 B2
(45) Date of Patent: Jan. 19, 2016

(54) PHOTOLUMINESCENCE DISPLAY DEVICE

(71) Applicant: Samsung Display Co., Ltd., Yongin (KR)

(72) Inventors: Seon-Tae Yoon, Seoul (KR); Jong Hyuk Kang, Suwon-si (KR); Jae Byung Park, Seoul (KR); Mun-Ki Sim, Seoul (KR); Dae Hyun Kim, Suwon-si (KR); Minki Nam, Anseong-si (KR); Haeil Park, Seoul (KR); Dong-Hoon Lee, Hwaseong-si (KR); Hyun Min Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 403 days.

(21) Appl. No.: 13/731,533

(22) Filed: Dec. 31, 2012

(65) Prior Publication Data
US 2013/0335799 A1 Dec. 19, 2013

(30) Foreign Application Priority Data
Jun. 14, 2012 (KR) .................. 10-2012-0063889

(51) Int. Cl.
G02B 26/02 (2006.01)
G02B 5/22 (2006.01)
G02F 1/1335 (2006.01)
B82Y 20/00 (2011.01)
F21V 8/00 (2006.01)

(52) U.S. Cl.
CPC ...... *G02B 26/02* (2013.01); *G02B 5/22* (2013.01); *G02F 1/133553* (2013.01); *G02F 1/133617* (2013.01); *B82Y 20/00* (2013.01); *G02B 6/0055* (2013.01); *Y10S 977/774* (2013.01)

(58) Field of Classification Search
CPC .......... G02B 5/22; G02B 5/26; G02B 6/0055; G02B 27/1006; G02F 1/133553; G02F 1/133617; B82Y 20/00; Y10S 977/774
USPC ....................................... 359/227
See application file for complete search history.

(56) References Cited

U.S. PATENT DOCUMENTS

| | | | |
|---|---|---|---|
| 5,146,355 A | 9/1992 | Prince et al. | |
| 6,891,583 B1 * | 5/2005 | Smith ............... | G02F 1/133528 349/71 |
| 7,649,594 B2 | 1/2010 | Kim et al. | |
| 7,746,423 B2 | 6/2010 | Im et al. | |
| 2006/0244367 A1 | 11/2006 | Im et al. | |
| 2009/0244906 A1 | 10/2009 | Kim | |
| 2010/0002175 A1 | 1/2010 | Kim et al. | |
| 2010/0208172 A1 | 8/2010 | Jang et al. | |
| 2011/0063542 A1 | 3/2011 | Park et al. | |
| 2011/0141388 A1 | 6/2011 | Park et al. | |
| 2011/0141394 A1 | 6/2011 | Kim et al. | |
| 2011/0141399 A1 | 6/2011 | Kim et al. | |

(Continued)

FOREIGN PATENT DOCUMENTS

JP 4530094 8/2010
KR 10-2004-0033204 4/2004
(Continued)

*Primary Examiner* — James Phan
(74) *Attorney, Agent, or Firm* — H.C. Park & Associates, PLC

(57) ABSTRACT

A display device includes a light source unit that emits a first light with a first wavelength, an optical filter that converts the first light to a second light, and an optical shutter that transmits or reflects the first light or the second light.

27 Claims, 13 Drawing Sheets

(56) References Cited

U.S. PATENT DOCUMENTS

| | | |
|---|---|---|
| 2011/0141769 A1 | 6/2011 | Lee et al. |
| 2011/0261291 A1 | 10/2011 | Park et al. |
| 2011/0299010 A1 | 12/2011 | Park et al. |
| 2011/0303940 A1 | 12/2011 | Lee et al. |
| 2011/0304524 A1 | 12/2011 | Seen |
| 2012/0050632 A1 | 3/2012 | Shih |
| 2013/0002986 A1* | 1/2013 | Kadowaki ......... G02F 1/133617 349/65 |

FOREIGN PATENT DOCUMENTS

| | | |
|---|---|---|
| KR | 10-2006-0086128 | 7/2006 |
| KR | 10-2008-0032473 | 4/2008 |
| KR | 10-2010-0057989 | 6/2010 |
| KR | 10-1068771 | 9/2011 |
| KR | 10-1098783 | 12/2011 |
| KR | 10-1110071 | 1/2012 |
| KR | 10-2012-0009015 | 2/2012 |
| KR | 1020130007746 | 1/2013 |

* cited by examiner

PHOTOLUMINESCENCE DISPLAY DEVICE

CROSS REFERENCE TO RELATED APPLICATION

This application claims priority from and the benefit of Korean Patent Application No. 10-2012-0063889, filed on Jun. 14, 2012, which is hereby incorporated by reference for all purposes as if fully set forth herein.

BACKGROUND OF THE INVENTION

1. Field of the Invention

Exemplary embodiments of the present disclosure relate to a photoluminescence display device.

2. Discussion of the Background

Due to recent advances in technology, thin and flat display devices, such as a liquid crystal display device, an electrowetting display device, and an electrophoretic display device, are widely used. Each display device includes a non-self-emission display panel and a separate backlight unit that may provide light to the display panel. The backlight unit provides a white light to the display panel and the white light is converted into light of a specific color by a color filter in the display panel, and thus a viewer perceives the light of the specific color.

SUMMARY OF THE INVENTION

Exemplary embodiments of the present invention disclose a display device having high light efficiency and wide viewing angle.

Exemplary embodiments of the present invention also disclose a display device capable of stable operation.

Additional features of the invention will be set forth in the description which follows, and in part will be apparent from the description, or may be learned by practice of the invention.

Exemplary embodiments of the present invention disclose a display device including a light source unit configured to emit a first light at a first wavelength, an optical filter including at least one color conversion portion configured to absorb the first light and to emit a second light at a second wavelength longer than the first wavelength, and a light reflective layer configured to reflect the first light and transmit the second light, and an optical shutter configured to transmit or block the first light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
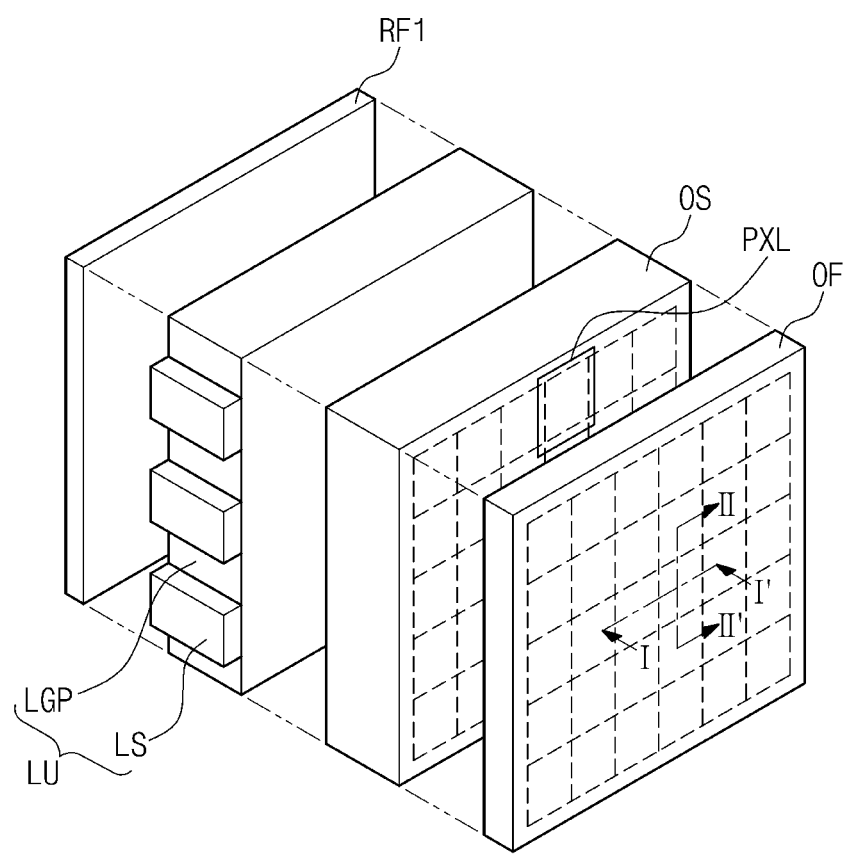
FIG. 1 is an exploded perspective view showing a portion of a display device according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

According to exemplary embodiments described below, a display device displays an image that is visible from one side or from both sides of the display device. For the convenience of explanation, a direction in which the image is displayed may be indicated by an arrow. In the display device that displays the visible image on one side, the surface on which the visible image is displayed may be referred to as a front surface or an upper surface and the surface on the other side (i.e., the side on which an image is not displayed) may be referred to as a rear surface or a lower surface. In the display device that displays the visible image on both sides, the surface on which a light source unit is disposed is referred to as a rear surface or a lower surface with reference to an optical shutter and the other side (i.e., the side on which a light source unit not is disposed) may be referred to as a front surface or an upper surface. However, the front and rear surfaces should not be limited. Positions of the front and rear surfaces may vary according to various operational modes, such as a reflective mode, a transmissive mode, or a transflective mode. According to exemplary embodiments of the present invention, the display device may be a segmented display type in which the image is built up of segments.

Figure 2:
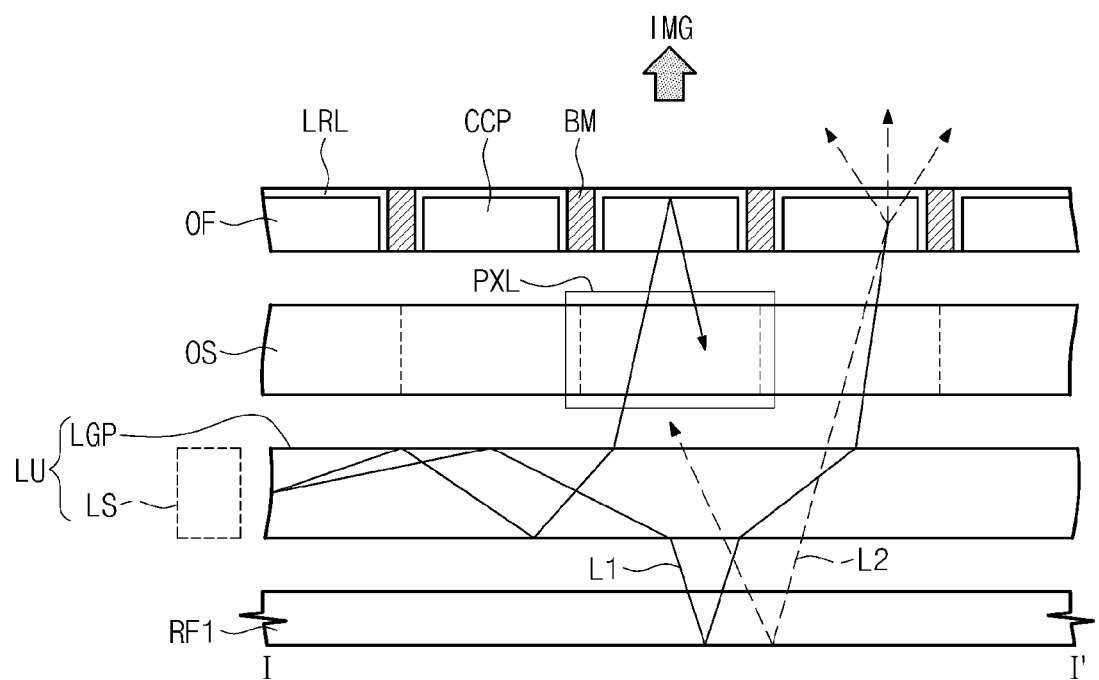
FIG. 2 is a cross-sectional view taken along a line I-I' of FIG. 1 according to exemplary embodiments of the present invention.

FIG. 1 is an enlarged perspective view showing a portion of a display device. FIG. 2 is a cross-sectional view taken along a line I-I' of FIG. 1.

Referring to FIG. 1 and FIG. 2, the display device displays the image on the front surface. The display device includes a light source unit LU to emit light, an optical shutter OS to receive the light, a reflective plate to reflect the light (referred to as a first reflective plate RF1), and an optical filter OF to convert the light from the optical shutter OS.

The light source unit LU includes a light source LS to emit the light and a light guide plate LGP to guide the light to the optical shutter OS. For example, the light source LS may be configured to include at least one light emitting diode and disposed to at least one side surface of the light guide plate LGP. The light source unit LU may be an edge illumination type since the light source LS is disposed at a position adjacent to a side of the optical shutter OS.

The light source LS may emit a first light L1 having a first wavelength, as indicated by a solid line in FIG. 2. The first wavelength may be in a wavelength bandwidth of an ultraviolet ray or in a wavelength bandwidth of near-ultraviolet ray. For example, the first wavelength may be about 400 nm or less. The first light L1 may have sufficient high-energy to allow the optical filter OF to convert the first light L1 to a visible light having an energy level lower than that of the first light L1 after the optical filter OF receives the first light L1.

The light guide plate LGP may include an incident surface facing the light source LS and an exit surface facing the optical shutter OS. The first light L1 may be incident on the light guide plate LGP through the incident surface and may exit from the exit surface after being reflected and refracted by the light guide plate LGP. The first light L1 may then exit from the light guide plate LGP onto the optical shutter OS.

The optical shutter OS may transmit or block light received from the light source unit LU. The optical shutter OS may be a light receiving device, such as a liquid crystal device, an electrophoretic device, an electrowetting device, or a microelectromechanical system (MEMS) device, but the light receiving device is not limited to the above-mentioned devices.

The optical shutter OS may include a plurality of pixels PXL arranged in a matrix configuration, an image display layer DSP, and an electrode used to drive the image display layer DSP.

The image display layer DSP may be driven by an electromagnetic force caused by an electric field or an electric potential difference related to the electrode to transmit or block the first light L1. The light receiving device may include a liquid crystal layer, an electrophoretic layer, an electrowetting layer, or a micro-shutter as the image display layer DSP.

The electrode may be provided in a singular number or a plural number to provide the electric field or the electric potential difference to the image display layer DSP. The electrode may include a first electrode EL1 and a second electrode EL2, which may be spaced apart from each other to cause the electric field or the electric potential difference. The arrangement of the first electrode EL1 and the second electrode EL2 may depend on the type of image display layer DSP or a driving scheme of the image display layer DSP.

When the liquid crystal layer is used as the image display layer DSP, the liquid crystal layer may include liquid crystal molecules having an optical anisotropy. The electrode may include the first electrode EL1 and the second electrode EL2 that apply the electric field to the liquid crystal layer. In some cases, the first electrode EL1 and the second electrode EL2 may be disposed to face each other, and the liquid crystal layer may be disposed therebetween to apply a vertical electric field to the liquid crystal layer. In some cases, the first electrode EL1 and the second electrode EL2 may be disposed at a side of the liquid crystal layer and may be spaced apart from each other to apply a horizontal electric field or a fringe field to the liquid crystal layer. The liquid crystal molecules may be driven by the electric field formed by the first electrode EL1 and the second electrode EL2 to transmit or block the light passing through the liquid crystal layer, and to enable display of the desired images.

When the electrophoretic layer is used as the image display layer DSP, the electrophoretic layer may include an insulating medium and charged particles. The insulating medium may correspond to a dispersive medium in a system in which the charged particles are dispersed. The charged particles may be dispersed in the insulating medium to represent an electrophoretic property. The electrode may include the first electrode EL1 and the second electrode EL2 that form the electric field in the electrophoretic layer. In some cases, the first electrode EL1 and the second electrode EL2 may be disposed to face each other and the electrophoretic layer may be disposed therebetween. In some cases, the first electrode EL1 and the second electrode EL2 may be disposed at a side portion of the electrophoretic layer to be spaced apart from each other. The charged particles may move in response to the electric field generated by the first electrode EL1 and the second electrode EL2 to transmit or block the light passing through the electrophoretic layer, and to enable display of the desired images.

When the electrowetting layer is used as the image display layer DSP, the electrowetting layer may include a first fluid and a second fluid, which may not be mixed with each other. The second fluid may have an electrical conductivity or may have a polarity. The electrode may include the first electrode EL1 and the second electrode EL2 that may apply the electric potential difference to the electrowetting layer. In some cases, the first electrode EL1 and the second electrode EL2 may be disposed to face each other, and the electrowetting layer may be disposed therebetween. In some cases, the first electrode EL1 and the second electrode ELs may be disposed at a side of the electrowetting layer to be spaced apart from each other. The first fluid and/or the second fluid may move in response to an electrostatic force caused by the electric potential difference generated by the first and second electrodes EL1 and EL2 in order to transmit or block the light passing through the electrowetting layer, so that the desired images may be displayed.

When the micro-shutter is used as the image display layer DSP, the micro-shutter may have a plate-like shape to transmit or block the light while moving. The electrode may be provided in the singular or plural number and at least one of the electrodes may have flexibility to move in response to an electric force. The micro-shutter may move in response to the electric force generated by a voltage applied to the electrode, and thus the micro-shutter may transmit or block the light, and the desired image may be displayed.

The image display layer DSP may serve as an optical switch in each pixel PXL, which may be electrically controlled.

The first reflective plate RF1 may be disposed to face the optical shutter OS. The light guide plate LGP may be provided in between the first reflective plate RF1 and the optical shutter OS. The first reflective plate RF1, the light guide plate LGP, and the optical shutter OS may be sequentially stacked. The first reflective plate RF1 may reflect light to allow the light to travel to the optical shutter OS. The light reflected by the reflective plate RF1 may include a second light L2.

The optical filter OF may convert the first light L1 provided through the optical shutter OS to the second light L2, as indicated by a dotted line in FIG. 2. The optical filter OF may include a color conversion portion CCP to convert the first light L1 to the second light L2 and a light reflective layer LRL to reflect the first light L1 and to transmit the second light L2.

The color conversion portion CCP may reduce the energy levels of the first light L1 to a ground state, thereby causing emission of the second light L2 having an energy level lower than an energy level of the first light L1. Accordingly, the second light L2 may have a second wavelength longer than that of the first light L1. The second light L2 may be the visible light whose a wavelength is in a range of about 400 nm to about 800 nm. The second light L2 may include a blue light having a wavelength of about 435 nm to about 480 nm, a green light having a wavelength of about 500 nm to about 560 nm, and a red light having a wavelength of about 650 nm to about 780 nm.

A plurality of color conversion portions CCPs may be provided. The color conversion portions CCPs may correspond to the pixels PXL in a one-to-one ratio or in a one-to-more than one ratio. Each of the color conversion portions CCPs may provide output of at least one of the blue light, the green light, or the red light to correspond to a corresponding pixel of the pixels PXL. In FIG. 2, the color conversion portions CCPs correspond to the pixels PXL of the optical shutter OS in a one-to-one ratio. A black matrix BM may be disposed between the color conversion portions CCPs to prevent light output from the color conversion portions CCPs from being mixed with each other.

The color conversion portion CCP may include a phosphor and/or a quantum dot as a color conversion material that absorbs the first light L1 and emits the second light L2.

The phosphor in the color conversion portion CCPs may emit at least one of blue light, green light, or red light as visible light.

The quantum dot may emit at least one of blue light, green light, or red light as visible light. The quantum dot and the phosphor may emit light having a full-width-half-maximum (FWHM) narrower than the light emitted through a color filter, thereby improving color reproducibility.

The quantum dot may be a material that has a nano-scaled structure and may include several hundred to several thousand atoms. Since the quantum dot is very small in size, a quantum confinement effect may occur. The quantum confinement effect may indicate that an energy band gap of an object is increased when the object becomes smaller than nano size. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The light reflective layer LRL may be provided on at least one side of the color conversion portion CCP to cover, at least partially, the color conversion portion CCP.

The light reflective layer LRL may reflect the first light L1 to the color conversion portion CCP to increase the frequency of use of the first light L1 in the color conversion portion CCP. On the other hand, the light reflective layer LRL may allow refraction of the visible light to be immediately perceived by a viewer. As shown in FIG. 2, the light reflective layer LRL may cover an upper surface and side surfaces of the color conversion portion CCP, e.g., a surface opposite to a surface of the color conversion portion CCP, which faces the light source unit LU and surfaces making contact with the black matrix BM, except for the surface facing the light source unit LU.

The light reflective layer LRL may be configured to include dielectric thin layers. The light reflective layer LRL may be configured to include 2n+1 (where n is a natural number greater than zero) or more thin layers, which may have different refractive indices from each other. The thin layers having different refractive indices from each other may be alternately arranged to form a half-mirror that may reflect light at a specific wavelength. The thin layers may include various inorganic materials having different refractive indices from each other, e.g., two different materials of silicon oxide, titanium oxide, and silicon nitride.

The light reflective layer LRL may be formed by alternately stacking a first material having a first refractive index and a second material having a second refractive index, different from the first refractive index, to form thin layers that reflect only the first light L1 and transmit the second light L2. Silicon nitride ($SiN_x$) and silicon oxide ($SiO_x$) may be sequentially stacked in 2n+1 layers such that an uppermost layer and a lowermost layer are formed of the same material. The silicon nitride has a refractive index of about 1.8 to about 1.9 and the silicon oxide has a refractive index of about 1.5, and the wavelength of the second light L2 passing through the light reflective layer LRL may be determined by adjusting the thickness of the thin layers.

Figure 3:
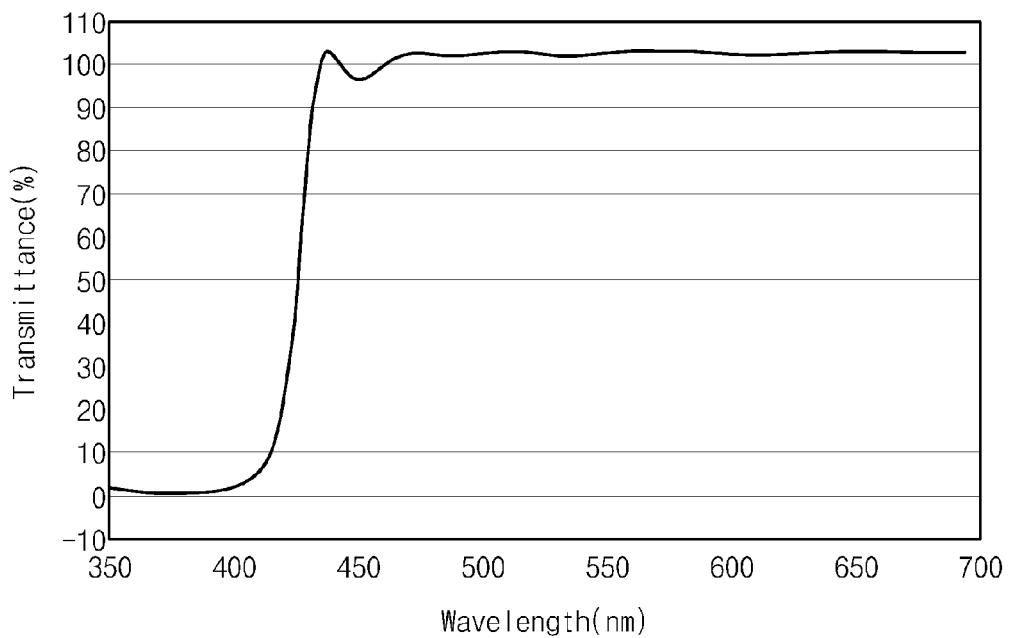
FIG. 3 is a graph showing transmittance as a function of wavelength of a glass substrate employing a light reflective layer according to exemplary embodiments of the present invention.
Figure 4:
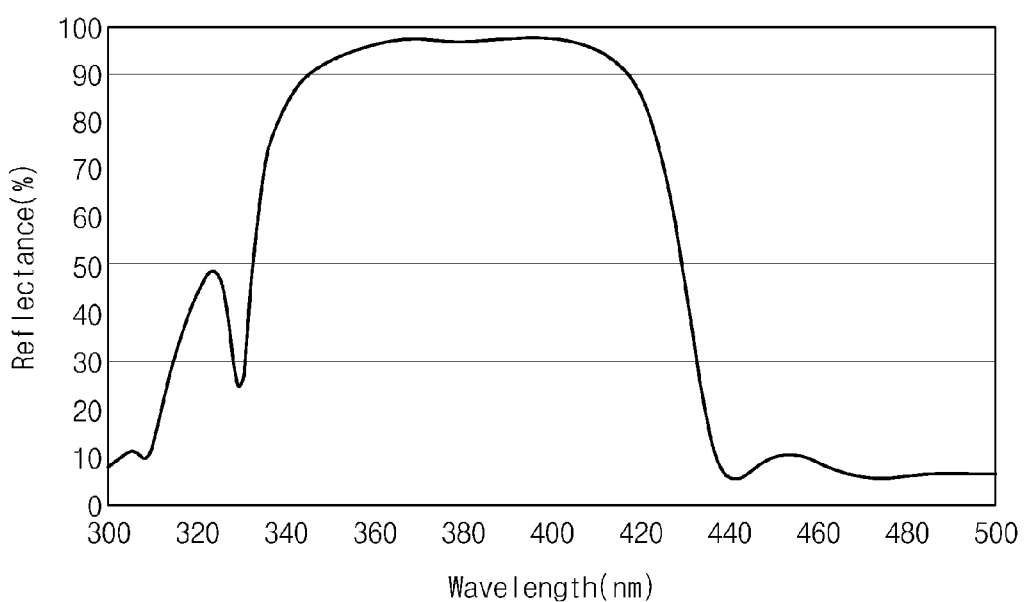
FIG. 4 is a graph showing reflectance as a function of wavelength of a glass substrate employing a light reflective layer according to exemplary embodiments of the present invention.

FIG. 3 is a graph showing transmittance as a function of wavelength of a glass substrate employing the light reflective layer LRL. FIG. 4 is a graph showing reflectance as a function of wavelength of a glass substrate employing the light reflective layer LRL. In FIG. 3 and FIG. 4, the light reflective layer LRL is set to reflect the ultraviolet ray and the near-ultraviolet ray. The glass substrate includes an anti-reflection layer.

Referring to FIG. 3, light having a wavelength of about 450 nm incident on the glass substrate has a transmittance of about 100%, light having the wavelength of about 425 nm incident on the glass substrate has a transmittance of about 50%, and light having the wavelength equal to or lower than about 400 nm incident on the glass substrate is blocked. In FIG. 3, the transmittance exceeding 100% may be the result of the anti-reflection layer.

Referring to FIG. 4, light having the wavelength of about 340 nm to about 420 nm incident to the glass substrate has a reflectance of about 90%. Light having wavelengths above 440 nm or below 310 nm is not reflected.

In the display device having the above structure, the first light L1 emitted from the light source unit LU may be perceived as the second light L2 after going through the following processes. Referring to FIG. 2, the first light L1 emitted from the light source LS may be reflected several times in the light guide plate LGP and may be refracted at an interface between the light guide plate LGP and the outside of the light guide plate LGP. The first light L1 may then be provided to the optical shutter OS. The first light L1 may be converted to the second light L2 by the color conversion portion CCP of the optical filter OF and may exit from the color conversion portion CCP in a radial shape. Among the second light L2, the light traveling to the front surface of the optical filter OF may be immediately perceived, and the light traveling to the rear surface of the optical filter OF may be perceived after being reflected by the first reflective plate RF1 and passing through the light guide plate LGP, the optical shutter OS, and the optical filter OF. Among the first light L1 passing through the optical shutter OS and reaching to the optical filter OF, the first light L1, which is not converted to the second light L2, may be reflected by the light reflective layer LRL to travel toward the rear surface of the optical shutter OS. In this case, the first light L1 may be converted to the second light L2 by the color conversion in the color conversion portion CCP, and the first light L1, which is not converted to the second light L2, may reach again to the color conversion portion CCP of the optical filter OF after being reflected by the first reflective plate RF1 and passing through the light guide plate LGP and the optical shutter OS. The first light L1 may be converted to the second light L2 by the color conversion portion CCP.

Through the above processes, the color conversion portion CCP may convert the first light L1 from the light source unit LU to the second light L2 without loss of the first light L1. In addition, when the light is converted by using quantum dots or phosphors, since the light, e.g., the second light L2, has a full-width-half-maximum (FWHM) narrower than the light emitted by the color filter, the color reproducibility is improved. Further, the second light L2 may exit from the color conversion portion CCP in the radial shape, and thus the display device may display the image with a wide viewing angle.

Figure 5:
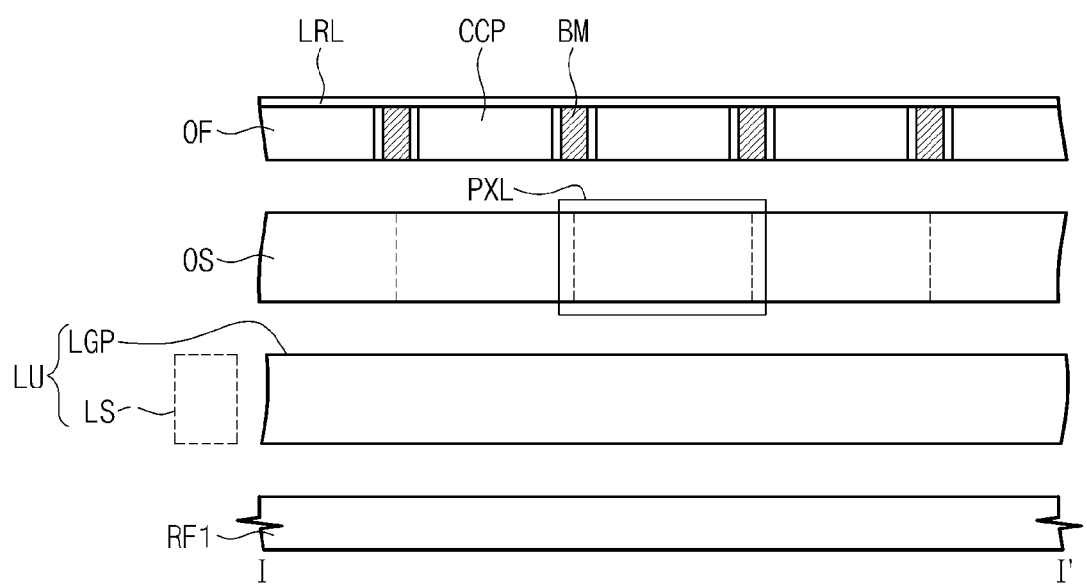
FIG. 5 is a cross-sectional view showing a display device according to exemplary embodiments of the present invention.

FIG. 5 is a cross-sectional view showing a display device. In FIG. 5, the same reference numerals denoted the same elements, and thus detailed descriptions of the same elements will be omitted.

Referring to FIG. 5, the display device may display an image on the front surface. The display device may include a light source unit LU to emit light, an optical shutter OS to receive the light, a first reflective plate RF1 to reflect the light, and an optical filter OF to convert the light from the optical shutter OS.

The light source unit LU may include a light source LS to emit the light and a light guide plate LGP to guide the light to the optical shutter OS. The light source LS may emit a first light L1 with a first wavelength. The light guide plate LGP may include an incident surface facing the light source LS and an exit surface facing the optical shutter OS. The first light L1 may be incident on the light guide plate LGP through the incident surface and may exit from the exit surface after being reflected and refracted by the light guide plate LGP. The first light L1 exiting from the light guide plate LGP may then be provided to the optical shutter OS.

The optical shutter OS may transmit or may block the light from the light source unit LU. The optical shutter OS may include a light receiving device, such as a liquid crystal device, an electrophoretic device, an electrowetting device, and a microelectromechanical system (MEMS) device; however, the light receiving devices is not be limited thereto. The optical shutter OS may include a plurality of pixels PXL arranged in a matrix form, an image display layer DSP, and an electrode used to drive the image display layer DSP.

The first reflective plate RF1 may be disposed to face the optical shutter OS. The light guide plate LGP may be disposed between the optical shutter OS and the first reflective plate RF1.

The optical filter OF may convert the first light L1 provided through the optical shutter OS to visible light with a specific color. The optical filter OF may include a color conversion portion CCP that converts the first light L1 to the second light L2 and a light reflective layer LRL that reflects the first light L1 and refracts or passes the second light L2. A plurality of color conversion portions CCPs may be provided. The color conversion portions CCPs may correspond to the pixels PXL in one-to-one ratio or in one-to-more than one ratio. Each of the color conversion portions CCPs may output at least one of blue light, green light, or red light to correspond to a corresponding pixel of the pixels PXL. A black matrix BM may be disposed between the color conversion portions CCPs to prevent light exiting from the color conversion portions CCP and being mixed with each other.

The light reflective layer LRL may be provided on at least one side of the color conversion portion CCP to partially cover the color conversion portion CCP. The light reflective layer LRL may cover a surface of the color conversion portion CCP opposite to a surface of the color conversion portion CCP, facing the light source unit LU. The light reflective layer LRL may be provided on the other sides of the color conversion portion CCP except for the surface of the color conversion portion CCP, facing the light source unit LU.

The display device may provide the same effect as the display device described with reference to FIG. 1 and FIG. 2. The display device may convert the first light L1 provided from the light source unit LU to the second light L2 without loss of the first light L1.

Figure 6:
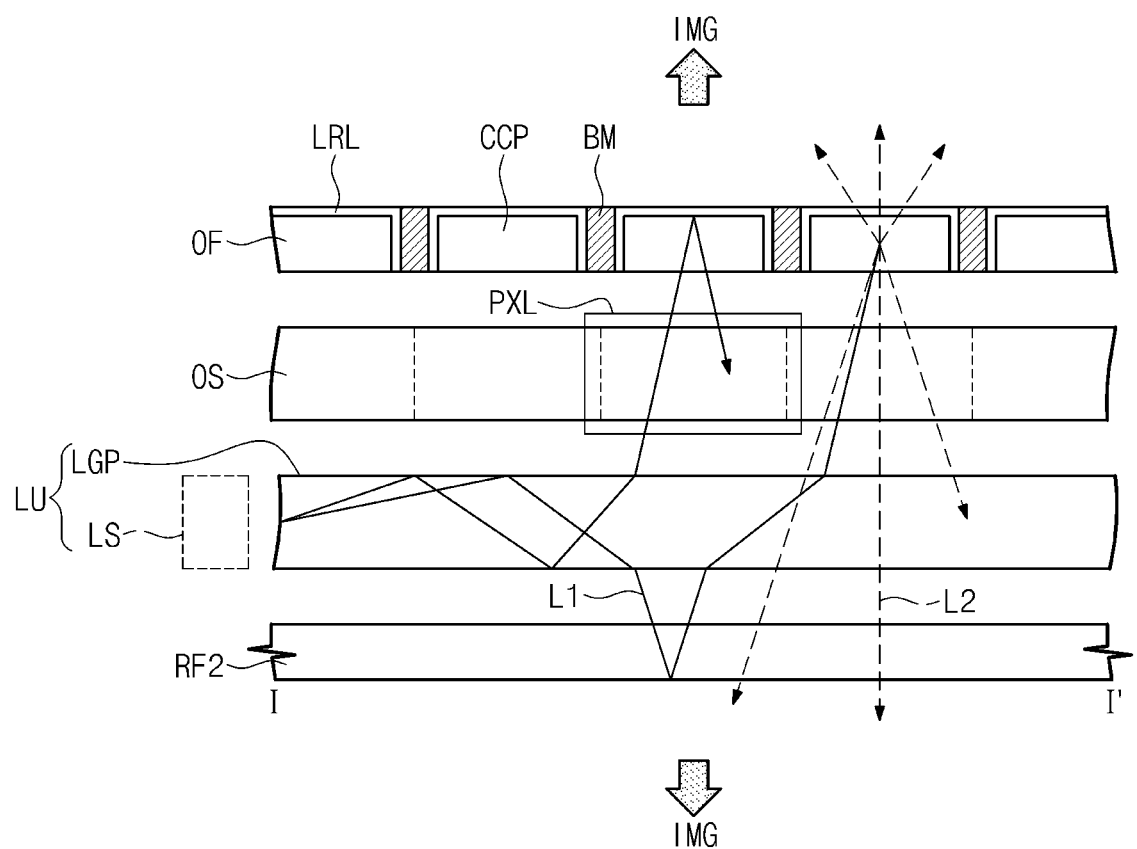
FIG. 6 is a cross-sectional view of a display device according to exemplary embodiments of the present invention.

FIG. 6 is a cross-sectional view showing a display device.

Referring to FIG. 6, the display device may display the image on both sides. The display device may include a light source unit LU to emit light, an optical shutter OS to receive the light, a second reflective plate RF2 to reflect the light, and an optical filter OF to convert the light from the optical shutter OS.

The light source unit LU may include a light source LS to emit light and a light guide plate LGP to guide light to the optical shutter OS. The light source LS may emit a first light L1 with a first wavelength. The light guide plate LGP may include an incident surface facing the light source LS and an exit surface facing the optical shutter OS. The first light L1 may be incident on the light guide plate LGP through the incident surface and may exit from the exit surface after being reflected and refracted by the light guide plate LGP. The first light L1 may exit from the light guide plate LGP and may then be provided to the optical shutter OS.

The optical shutter OS may transmit or may block the light from the light source unit LU. The optical shutter OS may include a light receiving device, such as a liquid crystal device, an electrophoretic device, an electrowetting device, and a microelectromechanical system (MEMS) device; however, the light receiving device is not be limited thereto. The optical shutter OS may include a plurality of pixels PXL arranged in a matrix form, an image display layer DSP, and an electrode used to drive the image display layer DSP.

The second reflective plate RF2 may be disposed to face the optical shutter OS. The light guide plate LGP may be disposed between the optical shutter OS and the second reflective plate RF2. In some cases, the second reflective plate RF2 may be provided under the light guide plate LGP, and the second reflective plate RF2, the light guide plate LGP, and the optical shutter OS may sequentially be stacked upward. Although not shown in FIG. 6, the second reflective plate RF2 may be provided with a transparent base film.

The second reflective plate RF2 may reflect the light not traveling to the optical shutter OS provided from the light source unit LU to allow the first light L1 to travel to the optical shutter OS. The second reflective plate RF2 may transmit the light (second light) except the first light L1 with the first wavelength.

The second reflective plate RF2 may reflect the first light L1 to the color conversion portions CCPs to increase the frequency of use of the first light L1 in the color conversion portions CCPs. In some cases, the second reflective plate RF2 may transmit the visible light in a downward direction to be immediately perceived by the eyes of the viewer.

The second reflective plate RF2 may be configured to include dielectric thin layers. For example, the second reflective layer RF2 may be configured to include 2n+1 or more thin layers, which may have different refractive indices. The thin layers having different refractive indices may be alternately arranged to form a half-minor that may reflect light at a specific wavelength. The thin layers may include various inorganic materials having different refractive indices, e.g., two different materials of silicon oxide, titanium oxide, and silicon nitride.

For example, the second reflective plate RF2 may be formed by alternately stacking a third material having a third refractive index and a fourth material having a fourth refractive index different from the third refractive index, forming the thin layers that reflect only the first light L1 and transmit the second light L2. In the exemplary embodiments of the present invention, silicon nitride (SiNx) and silicon oxide (SiOx) may be sequentially stacked in 2n+1 layers such that an uppermost layer and a lowermost layer are formed of the same material. The silicon nitride has a refractive index of about 1.8 to about 1.9 and the silicon oxide has a refractive index of about 1.5, so that the wavelength of the second light L2 passing through the light reflective layer LRL may be determined by adjusting the thickness of the thin layers.

The optical filter OF may convert the first light L1 provided through the optical shutter OS to visible light with a specific color. The optical filter OF may include a color conversion portion CCP that may convert the first light L1 to the second light L2 and a light reflective layer LRL that may reflect the first light L1 and refracts or passes the second light L2.

A plurality of color conversion portions CCPs may be provided. The color conversion portions CCPs may correspond to the pixels PXL in one-to-one ratio or in one-to-more than one ratio. For example, each of the color conversion portions CCPs may provide at least one of blue light, green light, or red light to correspond to a corresponding pixel of the pixels PXL. A black matrix BM may be disposed between the color conversion portions CCPs to prevent light exiting from the color conversion portions CCPs from being mixed.

The light reflective layer LRL may be provided on at least one side of the color conversion portion CCP to cover, at least partially, the color conversion portion CCP. The light reflective layer LRL may reflect the first light L1 to the color conversion portion CCP to increase the frequency of use of the first light L1 in the color conversion portion CCP. In some cases, the light reflective layer LRL may transmit the visible light to be immediately perceived by the eyes of the viewer. In some other cases, as shown in FIG. 6, the light reflective layer LRL may cover an upper surface and a side surface of the color conversion portion CCP, e.g., a surface opposite to a surface of the color conversion portion CCP facing the light source unit LU and a surface making contact with the black matrix BM, except for the surface facing the light source unit LU.

In the display device having the aforementioned structure, the first light L1 emitted from the light source unit LU may be perceived by the eyes of the viewer as the second light L2. Referring to FIG. 6, the first light L1 emitted from the light source LS may be reflected several times in the light guide plate LGP and refracted at an interface between the light guide plate LGP and the outside of the light guide plate LGP. The first light L1 may then be provided to the optical shutter OS. The first light L1 may be converted to the second light L2 by the color conversion portion CCP of the optical filter OF and may exit from the color conversion portion CCP in a radial shape. Among the second light L2, the light traveling to the front surface of the optical filter OF may be immediately perceived by the eyes of the viewer, and the light traveling to the rear surface of the optical filter OF may be perceived by the eyes of the viewer at a position facing the rear surface of the optical filter OF after passing through the optical shutter OS, the light guide plate LGP, and the second reflective plate RF2.

Among the first light L1 passing through the optical shutter OS and reaching to the optical filter OF, the first light L1, which is not converted to the second light L2, may be reflected by the light reflective layer LRL toward the rear surface of the optical shutter OS. For example, the first light L1 may be converted to the second light L2 by the color conversion in the color conversion portion CCP, or the first light L1, which is not converted to the second light L2, may reach the color conversion portion CCP of the optical filter OF after being reflected by the second reflective plate RF2 and passing through the light guide plate LGP and the optical shutter OS. The first light L1 may be converted to the second light L2 by the color conversion portion CCP.

Through the aforementioned processes, the color conversion portion CCP may convert the first light L1 to the second light L2 without loss of the first light L1. In some cases, two reflective plates may be prepared to reflect the first light L1 and transmit the second light L2, thereby increasing the frequency of use of the first light L1. In addition, the display device that displays the image on both sides may prevent deterioration of brightness.

Figure 7:
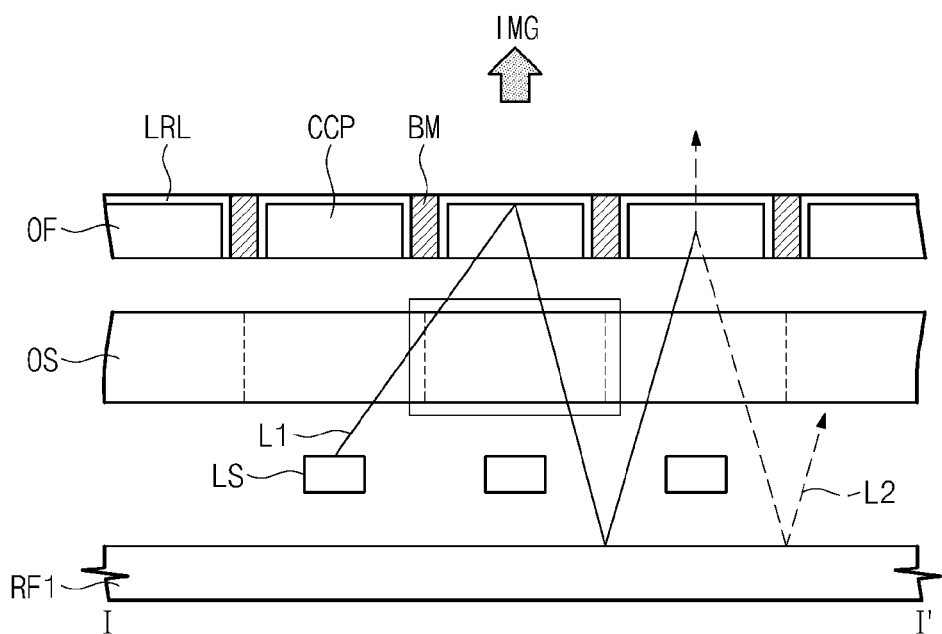
FIG. 7 is a cross-sectional view of a portion of a display device according to exemplary embodiments of the present invention.

FIG. 7 is a cross-sectional view showing a portion of a display device.

Referring to FIG. 7, the display device displays the image on one surface. The display device may include a light source unit LU to emit light, an optical shutter OS to receive the light, a first reflective plate RF1 to reflect the light, and an optical filter OF to convert the light from the optical shutter OS.

The light source unit LU may include a plurality of light sources LS disposed under the optical shutter OS to emit the light. The light sources LS may be light emitting diodes. Since the light sources LS are disposed under the optical shutter OS, the light source unit LU may be a direct illumination type light source unit.

The optical shutter OS may transmit or block the light from the light source unit LU. The optical shutter OS may be a light receiving device, such as a liquid crystal device, an electrophoretic device, an electrowetting device, a microelectromechanical system (MEMS) device; however, exemplary embodiments of the present invention is not limited to the above-mentioned devices. The optical shutter OS may include a plurality of pixels PXL arranged in a matrix form, an image display layer DSP, and an electrode used to drive the image display layer DSP.

The first reflective plate RF1 may be disposed to face the optical shutter OS while interposing the light guide plate LGP.

The optical filter OF may convert the first light L1 provided through the optical shutter OS to the visible light with a specific color. The optical filter OF may include a color conversion portion CCP that may convert the first light L1 to the second light L2 and a light reflective layer LRL that may reflect the first light L1 and refracts and passes the second light L2. A plurality of the color conversion portion CCP may be provided. The color conversion portions CCP may correspond to the pixels PXL in one-to-one ratio or in one-to-more than one manner. Each of the color conversion portions CCP may emit at least one of blue light, green light, or red light to correspond to a corresponding pixel of the pixels PXL as the second light L2. A black matrix BM may be disposed between the color conversion portions CCPs to prevent light exiting from the color conversion portions CCPs from being mixed with each other.

The light reflective layer LRL may be provided on at least one side of the color conversion portion CCP to cover, at least partially, the color conversion portion CCP. The light reflective layer LRL may reflect the first light L1 to the color conversion portion CCP to increase the frequency of use of the first light L1 in the color conversion portion CCP.

The display device may convert the first light L1 provided from the light source unit LU to the second light L2 without loss of the first light L1.

Figure 8:
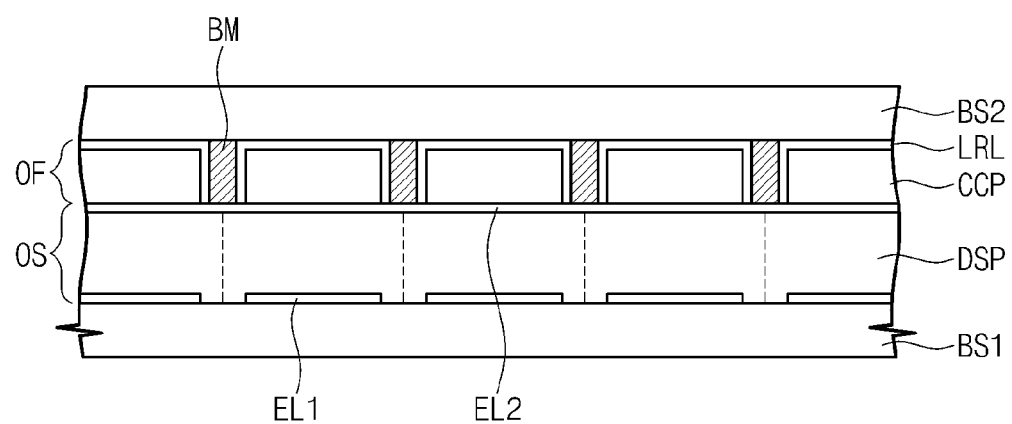
FIG. 8 is a cross-sectional view of a portion of a display device according to exemplary embodiments of the present invention.

FIG. 8 is a cross-sectional view showing a portion of a display device. In FIG. 8, the light source unit LU and the first or second reflective plates RF1 or RF2 have been omitted. The light source unit LU and the first or second reflective plates RF1 or RF2 follow the aforementioned structure and function.

Referring FIG. 8, the display device may have the optical filter OF in an in-cell structure, in which the optical filter OF may be formed between two base substrate BS together with an optical shutter OS, and may display the image on one side or both sides.

The display device may include a light source unit (not shown) to emit light, the optical shutter OS to receive the light, a first or second reflective plate (not shown) to reflect the light, and the optical filter OF to convert the light from the optical shutter OS. The display device may also include a first base substrate BS1 and a second base substrate BS2, which may face each other. The image display layer DSP and the optical filter OF may be disposed between the first base structure BS1 and the second base structure BS2. The first base substrate BS1, the optical shutter OS, the optical filter OF, and the second base substrate BS2 may be sequentially stacked one on another.

The first base substrate BS1 and/or the second base substrate BS2 may be, but not limited to, a transparent insulator, which may be formed of a polymer, such as glass or plastic. When the first base substrate BS1 and/or the second base substrate BS2 are/is a plastic substrate, the first base substrate BS1 and/or the second base substrate BS2 are/is formed of polyethylene terephthalate (PET), fiber reinforced plastic (FRP), or polyethylene naphthalate (PEN). In addition, the first base substrate BS1 and/or the second base substrate BS2 may be rigid or flexible.

The optical shutter OS may transmit or may block the light and may include the image display layer DSP and an electrode used to drive the image display layer DSP. In the exemplary embodiments of the present invention, the electrode may include a first electrode EL1 and a second electrode EL2, which may be spaced apart from each other and applied with different voltages. The first electrode EL1 may be disposed on the first base substrate BS1 and the second electrode EL2 may be disposed to face the first electrode EL1, but exemplary embodiments of the present invention is not be limited thereto. For example, both the first electrode EL1 and the second electrode EL2 may be disposed on the first base substrate BS1. The image display layer DSP may be disposed between the first electrode EL1 and the second electrode EL2. The image display layer DSP may be a light receiving device, such as a liquid crystal layer, an electrophoretic layer, an electrowetting layer, and a micro-shutter.

The optical filter OF may be disposed between the optical shutter OS and the second base substrate BS2.

The display device may be formed by the first electrode EL1 being disposed on the first base substrate BS1, sequentially forming the optical filter OF and the second electrode EL2 being disposed on the second base substrate BS2, and forming the image display layer DSP between the first base substrate BS1 and the second base substrate BS2.

When the image display layer DSP is the liquid crystal layer, a first polarizing member may be attached to a lower surface of the first base substrate BS1 and a second polarizing member having a polarization axis different from that of the first polarizing member may be provided between the second electrode EL2 and the optical filter OF.

Figure 9:
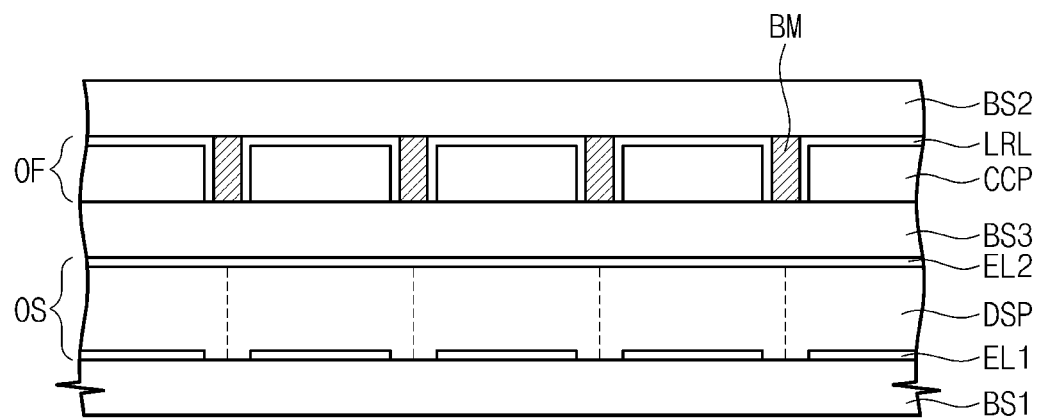
FIG. 9 is a cross-sectional view of a portion of a display device according to exemplary embodiments of the present invention.

FIG. 9 is a cross-sectional view showing a portion of a display device. In FIG. 9, the light source unit LU and the first or second reflective plates RF1 or RF2 have been omitted. The light source unit LU and the first or second reflective plates RF1 or RF2 follow the aforementioned structure and function.

Referring to FIG. 9, the display device may have an optical filter OF in an on-cell structure, in which the optical filter OF may be spaced apart from an optical shutter OS disposed between two substrates and disposed on an outer surface of one of the two substrates. The display device may display the image on one side or both sides.

The display device may include a light source unit (not shown) to emit light, the optical shutter OS to receive the light, a first or second reflective plate (not shown) to reflect the light, and the optical filter OF to convert the light from the optical shutter OS. The display device may also include a first base substrate BS1, a second base substrate BS2 facing the first base substrate BS1. The image display layer DSP and the optical filter OF may be disposed between the first base substrate BS1 and the second base substrate BS2, and a third base substrate BS3 disposed between the image display layer DSP and the optical filter OF. The first base substrate BS1, the optical shutter OS, the third base substrate BS3, the optical filter OF, and the second base substrate BS2 may be sequentially stacked one on another.

The first base substrate BS1, the second base substrate BS2, and/or the third base substrate BS3 may be a transparent insulator, which may be formed of a polymer, such as glass or plastic.

The optical shutter OS may transmit or may block the light provided from the light source unit LU and may include the image display layer DSP displaying the image and an electrode used to drive the image display layer DSP. In the exemplary embodiments of the present invention, the electrode may include a first electrode EL1 and a second electrode EL2, which may be spaced apart from each other and may be applied with different voltages. The first electrode EL1 may be disposed on the first base substrate BS1 and the second electrode EL2 may be disposed on the third base substrate BS3 to face the first electrode EL1, but the exemplary embodiments of the present invention is not be limited thereto. For example, both the first electrode EL1 and the second electrode EL2 may be disposed on the first base substrate BS1. The image display layer DSP may be disposed between the first electrode EL1 and the second electrode EL2. The image display layer DSP may be a light receiving device, such as a liquid crystal layer, an electrophoretic layer, an electrowetting layer, and a micro-shutter.

The optical filter OF may be disposed between the third base substrate BS3 and the second base substrate BS2.

The display device may be formed by the first electrode EL1 being disposed on the first base substrate BS1, forming the second electrode EL2 on the third base substrate BS3, forming the image display layer DSP between the first base substrate BS1 and the third base substrate BS3, forming the optical filter OF on the second base substrate BS2, and attaching the second base substrate BS2 on the outer surface of the third base substrate BS3.

Figure 10:
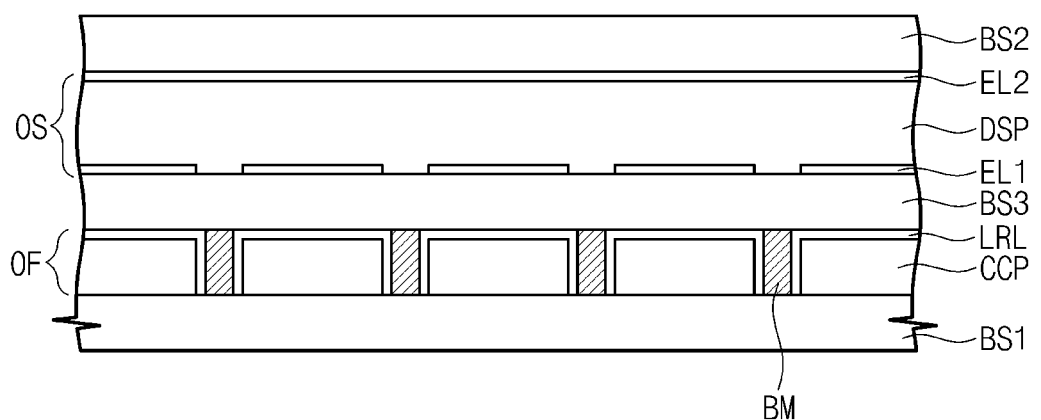
FIG. 10 is a cross-sectional view of a portion of a display device according to exemplary embodiments of the present invention.

FIG. 10 is a cross-sectional view showing a portion of a display device. In FIG. 10, the light source unit LU and the first or second reflective plates RF1 or RF2 have been omitted. The light source unit LU and the first or second reflective plates RF1 or RF2 follow the aforementioned structure and function.

Referring to FIG. 10, the display device may have an optical filter OF in an on-cell structure, in which the optical filter OF may be spaced apart from an optical shutter OS disposed between two substrates and may be disposed on an outer surface of one of the two substrates. The display device may display the image on one side or both sides.

The display device may include a light source unit (not shown) to emit light, the optical shutter OS to receive the light, a first or second reflective plate (not shown) to reflect the light, and the optical filter OF to convert the light from the optical shutter OS. The display device may also include a first base substrate BS1, a second base substrate BS2 facing the first base substrate BS1. The optical shutter OS and the optical filter OF may be disposed between the first base substrate BS1 and the second base substrate BS2, and a third base substrate BS3 disposed between the image display layer DSP and the optical filter OF. The first base substrate BS1, the optical filter OF, the third base substrate BS3, the optical shutter OS, and the second base substrate BS2 may be sequentially stacked one on another.

The first base substrate BS1, the second base substrate BS2, and/or the third base substrate BS3 may be a transparent insulator, which may be formed of a polymer, such as glass or plastic.

The optical shutter OS may transmit or may block the light provided from the light source unit LU and may include the image display layer DSP displaying the image and an electrode used to drive the image display layer DSP. In the exemplary embodiments of the present invention, the electrode may include a first electrode EL1 and a second electrode EL2, which may be spaced apart from each other and may be applied with different voltages. The first electrode EL1 may be disposed on the third base substrate BS3 and the second electrode EL2 may be disposed on the second base substrate BS2 to face the first electrode EL1; however, exemplary embodiments may not be limited thereto. For example, both the first electrode EL1 and the second electrode EL2 may be disposed on the third base substrate BS3. The image display layer DSP may be disposed between the first electrode EL1 and the second electrode EL2. The image display layer DSP may be a light receiving device, such as a liquid crystal layer, an electrophoretic layer, an electrowetting layer, and a micro-shutter.

The optical filter OF may be disposed between the first base substrate BS1 and the third base substrate BS3.

The display device may be formed by the first electrode EL1 being disposed on the third base substrate BS3, forming the second electrode EL2 on the second base substrate BS2, forming the image display layer DSP between the second base substrate BS2 and the third base substrate BS3, forming the optical filter OF on the first base substrate BS1, and attaching the first base substrate BS1 on the outer surface of the third base substrate BS3.

The first light L1 may be converted to the second light L2 while passing through the optical filter OF, and then the second light L2 may be provided to the optical shutter OS to display the image.

Figure 11:
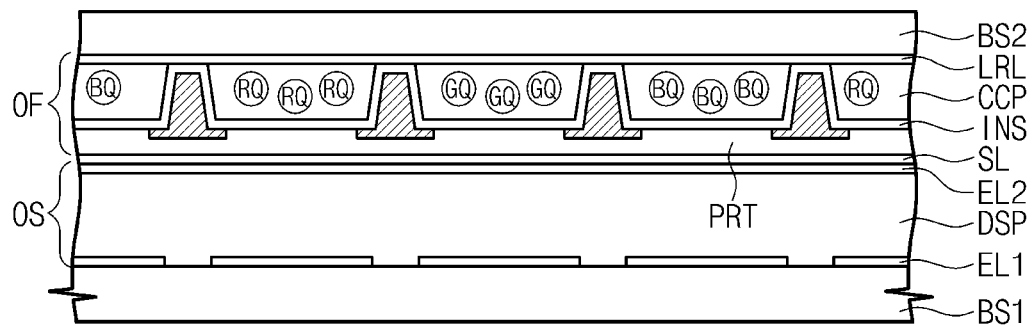
FIG. 11 is a cross-sectional view of a portion of a display device according to exemplary embodiments of the present invention.

FIG. 11 is a cross-sectional view showing a portion of a display device. In FIG. 11, the light source unit LU and the first or second reflective plates RF1 or RF2 have been omitted. An optical filter OF has been described in detail. The light source unit LU and the first or second reflective plates RF1 or RF2 follow the aforementioned structure and function.

Referring to FIG. 11, the display device may have an optical filter OF in an in-cell structure and may display the image on one side or both sides.

The display device may include a light source unit (not shown) to emit light, the optical shutter OS to receive the light, the first or second reflective plate (not shown) to reflect the light, and the optical filter OF to convert the light from the optical shutter OS. The display device may also include a first base substrate BS1, a second base substrate BS2, which may face each other. The optical filter OF and the image display layer DSP may be disposed between the first base substrate BS1 and the second base substrate BS2. The first base substrate BS1, the optical shutter OS, the optical filter OF, and the second base substrate BS2 may be sequentially stacked one on another.

The first base substrate BS1 and/or the second base substrate BS2 may be a transparent insulator, which may be formed of a polymer, such as glass or plastic.

The optical shutter OS may transmit or may block the light provided from the light source unit LU and may include the image display layer DSP displaying the image and an electrode used to drive the image display layer DSP.

The optical filter OF may convert the first light L1 provided through the optical shutter OS to visible light with a specific color. The optical filter OF may include color conversion portions CCPs that may convert the first light L1 to the second light L2. A light reflective layer LRL that may reflect the first light L1 and refracts and passes the second light L2.

A plurality of color conversion portion CCP may be provided. The color conversion portions CCPs may correspond to the pixels PXL in one-to-one ratio or in one-to-more than one ratio. Each of the color conversion portions CCPs may emit at least one of blue light, green light, or red light to correspond to a corresponding pixel of the pixels PXL as the second light L2. Each color conversion portion CCP may have a micro-cavity CVT filled with a color conversion material. The color conversion portions CCPs may include an insulating layer INS disposed on the second base substrate BS2 to define the micro-cavity CVT in accordance with the second base substrate BS2. A color conversion layer CCL may be provided in the micro-cavity CVT. The color conversion material may include quantum dots and/or phosphors, and red quantum dot RQ, green quantum dot GQ, or blue quantum dot BQ. The quantum dots may be provided in every color conversion portions CCPs as shown in FIG. 11.

A black matrix BM may be disposed between the color conversion portions CCPs to prevent lights exiting from the color conversion portions CCP from being mixed with each other.

The light reflective layer LRL may be disposed on a surface of the second base substrate BS2.

FIG. 12A, FIG. 12B, FIG. 12C, FIG. 12D, and FIG. 12E are cross-sectional views explaining a manufacturing method of the display device taken along a line I-I' of FIG. 1. FIG. 13A, FIG. 13B, FIG. 13C, FIG. 13D, and FIG. 13E are cross-sectional views explaining a manufacturing method of the display device taken along a line II-II' of FIG. 1.

Figure 12A:
FIG. 12A, FIG. 12B, FIG. 12C, FIG. 12D, and FIG. 12E are cross-sectional views taken along a line I-I' of FIG. 1, of a manufacturing method of the display device according to exemplary embodiments of the present invention.
Figure 13A:
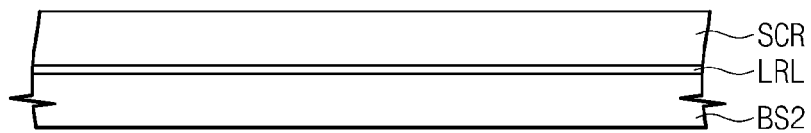
FIG. 13A, FIG. 13B, FIG. 13C, FIG. 13D, and FIG. 13E are cross-sectional views, taken along a line II-II' of FIG. 1, of a manufacturing method of the display device according to exemplary embodiments of the present invention.

Referring to FIG. 12A and FIG. 13A, the light reflective layer LRL may be formed on the second base substrate BS2. The light reflective layer LRL may be formed by stacking dielectric thin layers, e.g., silicon nitride (SiNx), silicon oxide (SiO2), having different refractive indices from each other. A sacrificial layer SCR may be formed on the light reflective layer LRL to be extended in one direction. The sacrificial layer SCR may be formed of an organic polymer material. The organic polymer material may be an organic material containing benzocyclobutene and acrylate; however, the organic polymer material may not be limited thereto. The sacrificial layer SCR may be removed to form the micro-cavity CVT and may be formed at positions at which the image display layer DSP may be formed. The sacrificial layer SCR may have width and height, respectively, corresponding to those of the micro-cavity CVT. The sacrificial layer SCR may not be formed at both end portions in a direction in which each pixel PXL is extended.

Figure 12B:
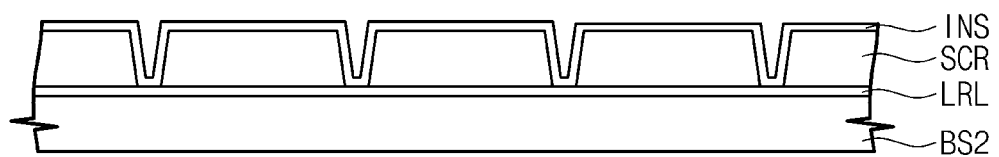
Figure 12D:
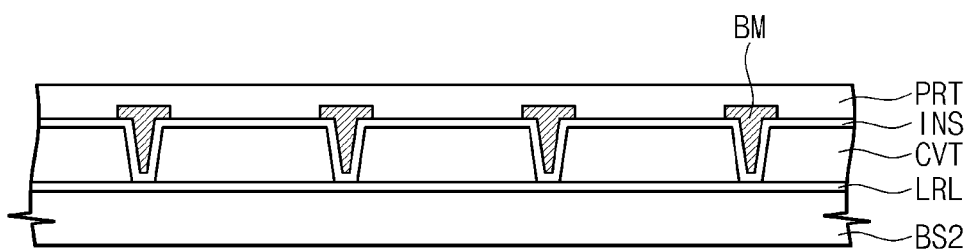
Figure 13B:
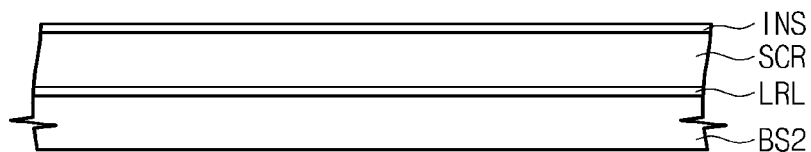
Figure 13C:
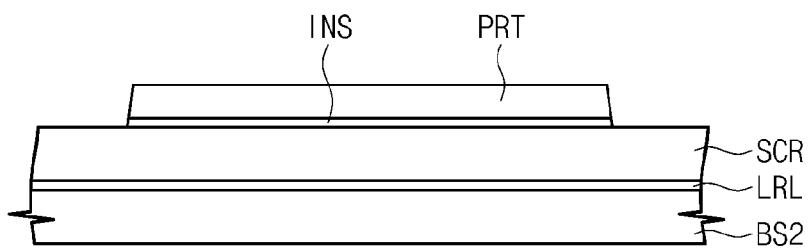

Referring to FIGS. 12B and 13B, the insulating layer INS may be formed on the sacrificial layer SCR. The insulating layer INS may serve as a supporter to maintain the micro-cavity CVT (refer to FIG. 12D and FIG. 13D) after the sacrificial layer SCR has been removed.

Figure 12C:
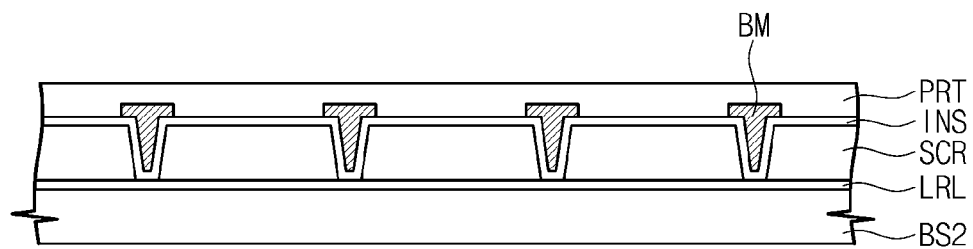

Referring to FIG. 12C and FIG. 12D, the black matrix BM and a protective layer PRT may be sequentially formed on the insulating layer INS. The black matrix BM may be formed between the pixels PXL. The black matrix BM may be extended in the direction in which the sacrificial layer SCR has been extended. The black matrix BM may be disposed between the sacrificial layer SCR and adjacent sacrificial layer SCR. The insulating layer INS may be formed over the entire surface of the second base substrate BS2. The protective layer PRT and the insulating layer INS may be patterned to expose at least a portion of the sacrificial layer SCR in area corresponding to each pixel PXL.

Figure 13D:
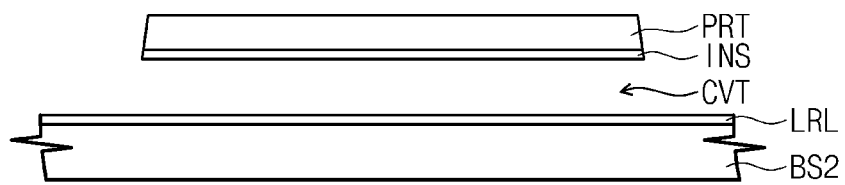

Referring to FIG. 12D and FIG. 13D, the sacrificial layer SCR may be removed by etching process. The sacrificial layer SCR may be etched through the portion exposed by the protective layer PRT and the insulating layer INS through a wet etch or a dry etch. The micro-cavity CVT may be the positions at which the sacrificial layer SCR is located.

Figure 12E:
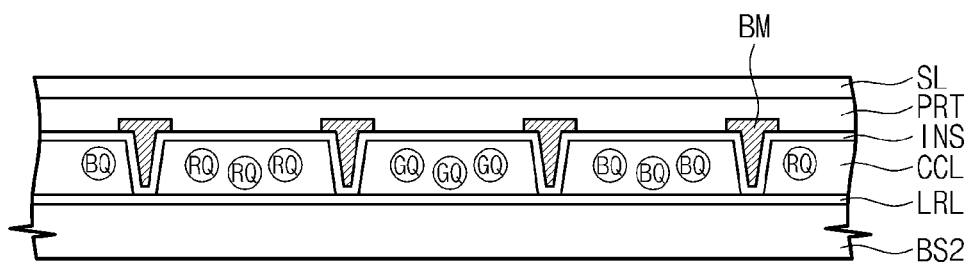
Figure 13E:
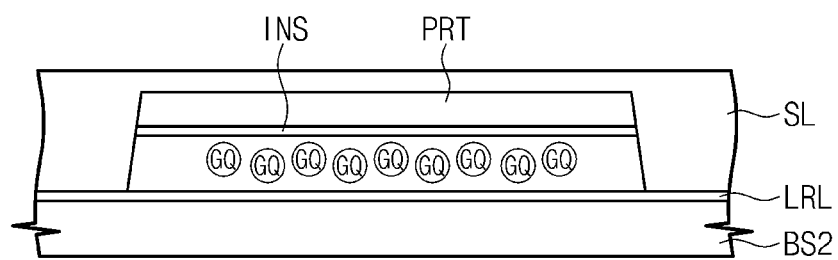

Referring to FIG. 12E and FIG. 13E, the color conversion portions CCPs may be formed in the micro-cavity CVT. Since the color conversion portions CCPs may include quantum dots and/or phosphors, red quantum dot RQ, green quantum dot GQ, and blue quantum dot BQ are shown in FIG. 12E. The color conversion portions CCPs may be formed by dropping the color conversion material near the micro-cavity CVT using a capillary phenomenon. The color conversion material located at positions other than the micro-cavity CVT may be removed and a sealant SL may be formed to surround the micro-cavity CVT. The sealant SL may seal opening of the micro-cavity CVT, through which the color conversion material may be injected.

There may be no processes utilizing heat or light substantially in the method of manufacturing the optical filter OF. The color conversion material, which may be sensitive to the heat or light, may be prevented from deterioration. According to the aforementioned method, the optical filter OF may be manufactured by filling the micro-cavity CVT with the color conversion material and sealing the micro-cavity CVT. The denaturalization of the color conversion material may be prevented. As a result, the display device may be stable in operation for a long time.

Figure 14:
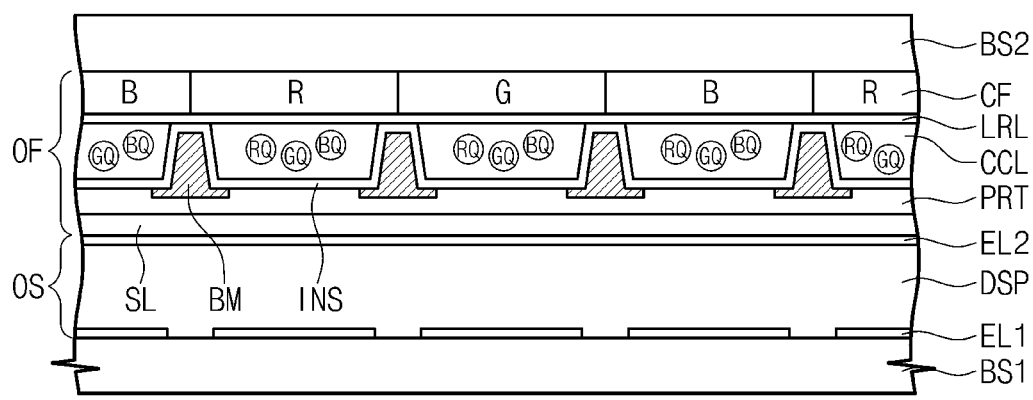
FIG. 14 is a cross-sectional view of a portion of a display device according to exemplary embodiments of the present invention.

FIG. 14 is a cross-sectional view showing a portion of a display device. Hereinafter, the same reference numerals denote the same elements in FIG. 11, and thus detailed descriptions of the same elements will be omitted in order to avoid redundancy.

Referring to FIG. 14, the display device may include a light source unit (not shown) to emit light, the optical shutter OS to receive the light, the first or second reflective plate (not shown) to reflect the light, and the optical filter OF to convert the light from the optical shutter OS. The display device may also include a first base substrate BS1 and a second base substrate BS2 facing the first base substrate BS1. The optical filter OF and the image display layer DSP may be disposed between the first base substrate BS1 and the second base substrate BS2. The first base substrate BS1, the optical shutter OS, the optical filter OF, and the second base substrate BS2 may be sequentially stacked one on another.

The first base substrate BS1 and/or the second base substrate BS2 may be a transparent insulator, which may be formed of a polymer, such as glass or plastic.

The optical shutter OS may transmit or may block the light provided from the light source unit LU and may include the image display layer DSP displaying the image and an electrode used to drive the image display layer DSP.

The optical filter OF may convert the first light L1 provided through the optical shutter OS to visible light with a specific color. The optical filter OF may include a color conversion portions CCPs that may convert the first light L1 to the second light L2, a light reflective layer LRL that may reflect the first light L1 and may refract and passes the second light L2, and a color filter CF providing the color to the second light L2.

The color conversion portions CCPs may provide the second light L2 to correspond to the pixels PXL, and the second light L2 may be a white light in the visible light range. The color conversion portions CCPs may include quantum dots and/or phosphors, and each color conversion portion CCP may include red quantum dot RQ, green quantum dot GQ, and blue quantum dot BQ to emit the white light.

Each color conversion portion CCP may have a micro-cavity CVT provided to correspond to the pixels PXL and filled with a color conversion material. The color conversion portions CCPs may include an insulating layer INS disposed on a surface of the second base substrate BS2 to define the micro-cavity CVT. according to the surface of the second base substrate BS2 and a color conversion layer CCL provided in the micro-cavity CVT.

A black matrix BM may be disposed between the color conversion portions CCPs to prevent lights exiting from the color conversion portions CCP from being mixed with each other.

The color filter CF may provide the white light and the light reflective layer LRL may be provided on the insulating layer INS to the micro-cavity CVT and the black matrix BM rather than on the surface of the second base substrate BS2. In some cases, the insulating layer INS may serve as the light reflective layer LRL. For example, the insulating layer INS may be a dielectric layer in which layers having different refractive indices from each other are stacked one on other.

In the exemplary embodiments of the present invention, since the light source unit may be disposed at a lower portion of the display device, the first light L1 traveling upward may be reflected. Accordingly, the light reflective light LRL may be disposed on the insulating layer INS of the micro-cavity CVT rather than the surface of the second base substrate BS2.

Figure 15:
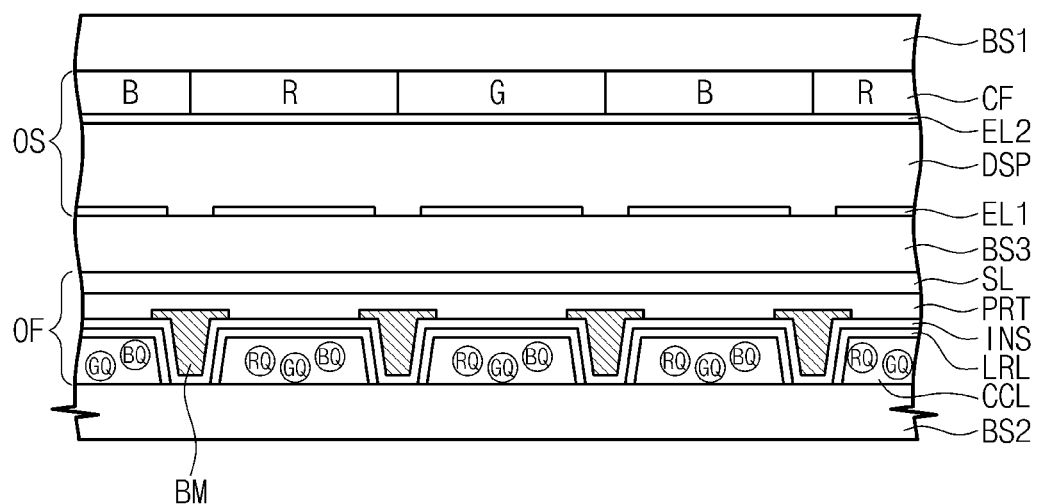
FIG. 15 is a cross-sectional view of a portion of a display device according to exemplary embodiments of the present invention.

FIG. 15 is a cross-sectional view showing a portion of a display device.

Referring to FIG. 15, the display device may include a light source unit LU (not shown) to emit light, the optical shutter OS to receive the light, the first reflective plate RF! or second reflective plate RF2 (not shown) to reflect the light, and the optical filter OF to convert the light from the optical shutter OS. The display device may also include a first base substrate BS1, a second base substrate BS2, which face each other. The optical filter OF and the optical shutter OS may be disposed between the first base substrate BS1 and the second base substrate BS2. A third base substrate BS3 may be disposed between the image display layer DSP and the optical filter OF, and the optical filter OF may be disposed under the optical shutter OS. The second base substrate BS2, the optical filter OF, and the third base substrate BS3, the optical shutter OS, and the first base substrate BS1 may be sequentially stacked one on another.

The first base substrate BS1, the second base substrate BS2, and/or the third base substrate BS3 may be a transparent insulator, which may be formed of a polymer, such as glass or plastic.

The optical shutter OS may transmit or may block the light provided from the light source unit LU and may include the image display layer DSP displaying the image, an electrode used to drive the image display layer DSP, and a color filter CF providing color to the light passing through the image display layer DSP. The color filter CF may have red, green, and blue colors, respectively, corresponding to the pixels PXL.

The optical filter OF may be disposed between the third base substrate BS3 and the second base substrate BS2. The optical filter OF may convert the first light L1 provided through the optical shutter OS to visible light with a specific color. The optical filter OF may include a color conversion portions CCPs that may convert the first light L1 to the second light L2 and a light reflective layer LRL that may reflect the first light L1 and refracts and passes the second light L2. The color conversion portions CCPs may provide the second light L2 to correspond to the pixels PXL, and the second light L2 may be a white light in the visible light range. The color conversion portions CCPs may include quantum dots and/or phosphors, and each color conversion portion CCP may include red quantum dot RQ, green quantum dot GQ, and blue quantum dot BQ to emit the white light.

Each color conversion portion CCP may have a micro-cavity CVT provided to correspond to the pixels PXL and filled with a color conversion material. The color conversion portions CCPs may include an insulating layer INS disposed on a surface of the second base substrate BS2 to define the micro-cavity CVT in accordance with the surface of the second base substrate BS2 and a color conversion layer CCL provided in the micro-cavity CVT.

In the display device having the aforementioned structure, the first light L1 from the light source unit LU may be converted to the second light L2 through the optical filter OF and the second light L2 may be provided to the optical shutter OS, displaying the color image.

Figure 16:
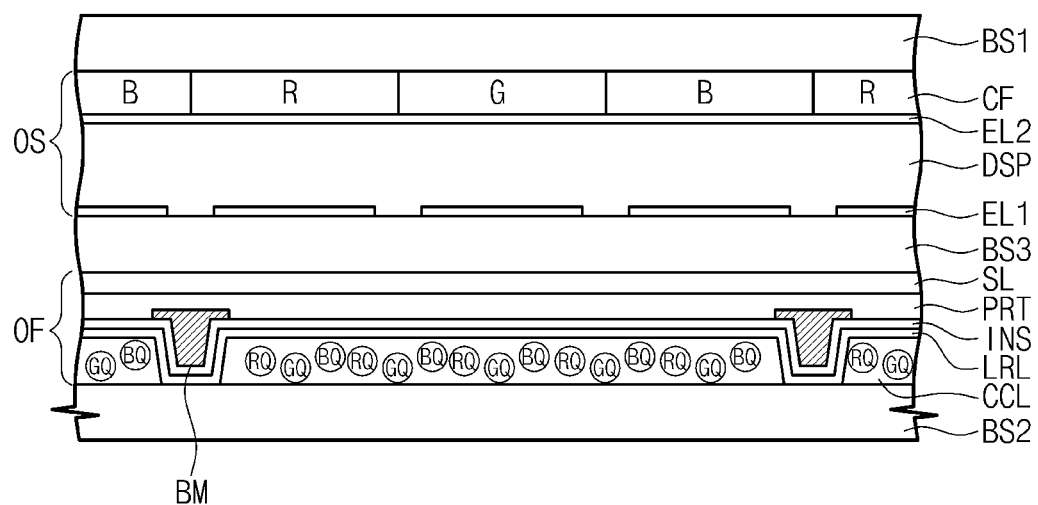
FIG. 16 is a cross-sectional view of a portion of a display device according to exemplary embodiments of the present invention.

FIG. 16 is a cross-sectional view showing a portion of a display device.

Referring to FIG. 16, the display device has the same structure as that of the display device except for the optical filter OF. In the exemplary embodiments of the present invention, the optical filter OF may include color conversion portions CCPs and a light reflective layer LRL. The color conversion portions CCPs may have a micro-cavity CVT provided to correspond to the pixels PXL and filled with a color conversion material. The color conversion portions CCPs may include an insulating layer INS disposed on a surface of the second base substrate BS2 to define the micro-cavity CVT in accordance with the surface of the second base substrate BS2 and a color conversion layer CCL provided in the micro-cavity CVT. The micro-cavity CVT may correspond to each pixel PXL or several pixels PXL. As shown in FIG. 16, three pixels PXL correspond to one micro-cavity CVT, but the exemplary embodiments of the present invention may not be limited thereto.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a light source unit configured to emit a first light at a first wavelength;
   an optical filter comprising:
      at least one color conversion portion configured to absorb the first light and to emit a second light at a second wavelength longer than the first wavelength; and
      a light reflective layer configured to reflect the first light and transmit the second light; and
   an optical shutter configured to transmit or block the first light.

2. The display device of claim 1, wherein the first wavelength corresponds to an ultraviolet or a near-ultraviolet wavelength, and the second light has a wavelength corresponding to a visible light wavelength.

3. The display device of claim 2, wherein the at least one color conversion portion comprises at least one of a quantum dot and phosphor to absorb the first light and to emit the second light.

4. The display device of claim 3, wherein the at least one color conversion portion comprises a plurality of color conversion portions and the second light emitted from each color conversion portion has at least one of a blue color, a green color, and a red color.

5. The display device of claim 2, wherein the light reflective layer comprises a multi-layer structure of at least two layers, and each layer of the light reflective layer comprises a different refractive index.

6. The display device of claim 5, wherein the light reflective layer comprises at least one first layer having a first refractive index and at least one second layer having a second refractive index different from the first refractive index, and the first layer and the second layer are alternately disposed with each other.

7. The display device of claim 1, wherein the optical shutter is disposed between the light source unit and the optical filter, and the light source unit faces the optical filter.

8. The display device of claim 7, wherein the light reflective layer is disposed on a first surface opposite to a second surface of the at least one color conversion portion, and the second surface faces the light source unit.

9. The display device of claim 8, wherein the light reflective layer covers a remaining surface of the color conversion portion other than the second surface of the color conversion portion.

10. The display device of claim 7, further comprising a reflective plate configured to reflect the first light and the second light, the light source unit being disposed between the reflective plate and the optical shutter, and the reflective plate facing the optical shutter.

11. The display device of claim 7, wherein the light source unit comprises:
   a light source configured to emit the first light; and
   a light guide plate configured to guide the first light from the light source to the optical shutter.

12. The display device of claim 11, further comprising a reflective plate configured to reflect the first light and to transmit or reflect the second light, the light guide plate being disposed between the reflective plate and the optical shutter.

13. The display device of claim 12, wherein the reflective plate comprises a multi-layer structure of at least three layers, and each layer of the reflective plate comprising different refractive indices.

14. The display device of claim 13, wherein the reflective plate comprises at least one third layer having a third refractive index and at least one fourth layer having a fourth refractive index different from the third refractive index, and the third layer and the fourth layer are alternately disposed with each other.

15. The display device of claim 1, wherein the optical shutter comprises an image display layer and an electrode that drives the image display layer.

16. The display device of claim 15, further comprising a first base substrate and a second base substrate facing the first base substrate, the image display layer and the optical filter being disposed between the second base substrate and the first base substrate.

17. The display device of claim 16, wherein the electrode is disposed between the first base substrate and the image display layer or between the image display layer and the optical filter, and the electrode comprises a first electrode and a second electrode, the first electrode and the second electrode being spaced apart from each other and configured to apply an electric field to the image display layer.

18. The display device of claim 16, further comprising a third base substrate disposed between the image display layer and the optical filter.

19. The display device of claim 18, wherein the electrode is disposed between a the first base substrate and the image display layer and/or between the image display layer and the third base substrate, and the electrode comprises a first electrode and a second electrode, the first electrode and the second electrode being spaced apart from each other and configured to apply an electric field to the image display layer.

20. The display device of claim 16, wherein the at least one color conversion portion comprises an insulating layer disposed on the second base substrate, the insulating layer, a surface of the second base substrate, and a color conversion portion defining a space for a micro-cavity.

21. The display device of claim 20, wherein the light reflective layer is disposed on a surface of the second base substrate.

22. The display device of claim 20, wherein the light reflective layer covers the insulating layer.

23. The display device of claim 20, wherein the optical shutter comprises a plurality of pixels arranged in a matrix form, the at least one color conversion portion comprising a plurality of the color conversion portions corresponding to the pixels.

24. The display device of claim 23, wherein the second light from each of the color conversion portions has at least one of a blue color, a green color, a red color, and a white color.

25. The display device of claim 23, wherein each of the color conversion portions corresponds to at least two pixels.

26. The display device of claim 20, wherein the insulating layer comprises a multi-layer structure of at least three layers, each layer of the insulating layer comprising different refractive indices to transmit the second light and reflect the first light.

27. The display device of claim 15, wherein the image display layer comprises a liquid crystal layer, an electrowetting layer, or an electrophoretic layer.

* * * * *